United States Patent
Xu et al.

(10) Patent No.: US 10,028,600 B2
(45) Date of Patent: Jul. 24, 2018

(54) FRAME ASSEMBLY AND DISPLAY DEVICE COMPRISING THE FRAME ASSEMBLY

(71) Applicant: BOE TECHNOLOGY GROUP CO., LTD., Beijing (CN)

(72) Inventors: Jian Xu, Beijing (CN); Hongfei Cheng, Beijing (CN); Yongchun Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 14/906,115

(22) PCT Filed: May 14, 2015

(86) PCT No.: PCT/CN2015/078999
§ 371 (c)(1),
(2) Date: Jan. 19, 2016

(87) PCT Pub. No.: WO2016/107049
PCT Pub. Date: Jul. 7, 2016

(65) Prior Publication Data
US 2016/0213173 A1    Jul. 28, 2016

(30) Foreign Application Priority Data

Jan. 4, 2015  (CN) .................... 2015 2 0003242 U

(51) Int. Cl.
*A47G 1/06*    (2006.01)
*G02F 1/1333*   (2006.01)

(52) U.S. Cl.
CPC ..... *A47G 1/0622* (2013.01); *G02F 1/133308* (2013.01); *G02F 2001/133317* (2013.01); *G02F 2201/465* (2013.01)

(58) Field of Classification Search
CPC ... G02F 1/133308; G02F 2001/133317; G02F 2201/465; A47G 1/0622
See application file for complete search history.

(56) References Cited

U.S. PATENT DOCUMENTS

2006/0209226 A1    9/2006  Chung
2012/0050635 A1*   3/2012  Yoo ................... G02F 1/133605
                                                             349/58
(Continued)

FOREIGN PATENT DOCUMENTS

CN    101169538 A    4/2008
CN    102346509 A    2/2012
(Continued)

OTHER PUBLICATIONS

Search Report and Written Opinion dated Oct. 12, 2015 from State Intellectual Property Office of the P.R. China.

*Primary Examiner* — Charles A Fox
*Assistant Examiner* — Christopher E Veraa
(74) *Attorney, Agent, or Firm* — Dilworth & Barrese, LLP; Michael J. Musella, Esq.

(57) ABSTRACT

A frame assembly and a display device including the frame assembly are provided. The frame assembly includes: a side frame and corresponding side plates, pressing plates and fixing plates; for at least one group of corresponding side plate, pressing plate and fixing plate, a structure as follows is provided: the side frame is fixedly connected to the side plate; the fixing plate is fixed on the side frame, and an outer surface of the fixing plate is not higher than an outer surface of the side plate; the side frame is provided with an elastic pad located on an inner side of the fixing plate, and a projection of the side frame and a projection of the elastic pad in a plane of a side surface of the side plate of the backplane facing the pressing plate is located within the side surface of the side plate facing the pressing plate. A width of (Continued)

the frame assembly is only a thickness of the side plate of the backplane to achieve a narrow frame design of the display device.

20 Claims, 5 Drawing Sheets

(56) References Cited

U.S. PATENT DOCUMENTS

| | | | | |
|---|---|---|---|---|
| 2012/0113348 A1* | 5/2012 | Wang | ................ | G02F 1/133615 349/58 |
| 2012/0162569 A1* | 6/2012 | Sekiguchi | ......... | G02F 1/133308 349/58 |
| 2013/0258708 A1 | 10/2013 | Huang | | |
| 2014/0055699 A1* | 2/2014 | Yu | ......................... | G02F 1/1335 349/42 |
| 2014/0160393 A1* | 6/2014 | Zhang | ............... | G02F 1/133308 349/58 |
| 2015/0055053 A1* | 2/2015 | Sasaoka | ............ | G02F 1/133308 349/58 |
| 2015/0116598 A1* | 4/2015 | Myojo | .............. | G02F 1/133308 348/725 |
| 2015/0131325 A1* | 5/2015 | Kokusho | ............ | G02F 1/133308 362/633 |
| 2015/0382483 A1* | 12/2015 | Sun | .................... | G02F 1/133308 361/679.01 |
| 2016/0334665 A1* | 11/2016 | Nakazawa | ........ | G02F 1/133308 |

FOREIGN PATENT DOCUMENTS

| CN | 102692741 A | 9/2012 |
|---|---|---|
| CN | 102889523 A | 1/2013 |
| CN | 203433224 U | 2/2014 |
| CN | 203686916 U | 7/2014 |

\* cited by examiner

FRAME ASSEMBLY AND DISPLAY DEVICE COMPRISING THE FRAME ASSEMBLY

TECHNICAL FIELD

Embodiments of the present disclosure relate to a frame assembly and a display device comprising the frame assembly.

BACKGROUND

In the field of display technology, the structure of a frame assembly in a display device is an important factor affecting the width of a side frame of the display device.

Typically, an assembly structure of the frame in the display device is shown in FIG. 1.

As shown in FIG. 1, generally the display device comprises a backplane 01, a front frame 02, a side frame 03, a backlight module and a display panel 06. For convenience of description, it is supposed that along a direction parallel to a light emergent surface of the display panel 06, the side facing an interior side of the display device is referred to as "inner", while the side facing an external side of the display device is referred to as "outer". The backplane 01 includes a base plate 012 and a plurality of side plates 011 to form a mounting tank for the backlight module. The backlight module includes a reflective sheet 05, a light source 041, a light guide plate 042 and an optical membrane 043, which are mounted in the mounting tank. The side frame 03 and the backplane 01 are fixedly connected as a support structure for supporting the display panel 06. A fixing plate 023 of the front frame 02 is engaged with the backplane 01 through an engagement structure 021, and a pressing plate 024 on the front frame 02 is affixed with a pad 022, to form a structure pressing the display panel 06 on both upper and lower sides; there is provided with a pad 031 between the side frame 03 and the display panel 06. The frame assembly of the display device includes the backplane 01, the front frame 02 and the side frame 03.

However, as shown in FIG. 1, typically a width of the frame assembly in the display device is large, as indicated by D1 in FIG. 1, the width D1 of the frame assembly contains a width of the fixing plate 023 of the front frame 02, a width of a coordinating portion of the front frame 02 with the side of the backplane 01, a width of the side of the backplane 01, and a width of the side frame 03 entering the backplane 01. If the width of the frame assembly is too large, a narrow side frame design of the display device can not be satisfied.

SUMMARY

Embodiments of the present disclosure provide a frame assembly and a display device comprising the frame assembly, and the frame assembly facilitates achieving a narrow frame design of a display device.

At least one embodiment of the present disclosure provides a frame assembly, comprising: a backplane, including a base plate and a plurality of side plates to form a mounting tank for mounting a backlight module; a front frame, having pressing plates parallel with the base plate and corresponding to the side plates one by one, and fixing plates parallel with the side plates and corresponding to the side plates one by one; and a side frame, located on one side, facing the pressing plates, of the backplane and located on an inner side of the fixing plates, the side frame and respective side plates of the backplane being fixedly connected. For at least one group of corresponding side plate, pressing plate and fixing plate, a structure as follows is provided: the fixing plate is fixed on the side frame, and an outer surface of the fixing plate is not higher than an outer surface of the side plate; the side frame is provided with an elastic pad located on an inner side of the fixing plate, an inner surface of the elastic pad provides a step surface for supporting and limiting a display panel, and a projection of the side frame and a projection of the elastic pad in a plane of a side surface, facing the pressing plate, of the side plate of the backplane are located within the side surface, facing the pressing plate, of the side plate.

For example, the side frame and the side plate coordinate to form a step surface located on an outer side of the side frame and configured to support the fixing plate.

For example, the side frame is provided with slots having an opening facing the pressing plate, a side surface, facing away from the pressing plates, of the elastic pad contains protrusions to be plugged into the slots, and the elastic pad is mounted on the side frame through the slots and the protrusions.

For example, the elastic pad has an integral sealed ring-like structure.

For example, the elastic pad includes a plurality of sub-elastic pads, and the plurality of sub-elastic pads are evenly distributed on the side frame.

For example, the elastic pad includes a plurality of sub-elastic pads, and the plurality of sub-elastic pads are evenly distributed on the side frame. The slots provided on the side frame correspond to the sub-elastic pads one by one.

For example, a side surface, facing away from the pressing plates, of the elastic pad contains a slot, a side surface of the side frame facing the pressing plate has a protrusion to be plugged into the slot, and the elastic pad is mounted on the side frame through the slot and the protrusion.

For example, the fixing plate is fixed on the side frame, comprising: the fixing plate and the side frame are connected through a plurality of pairs of snaps and slots engaged with each other.

For example, a pad that is convex to the backplane is set on a side surface, facing the base plate, of each of the pressing plates.

For example, a side surface, facing away from the pressing plates, of the elastic pad further has a pressing protrusion for pressing an optical membrane of the backlight module.

For example, the side frame and the backplane have an integral structure.

An embodiment of the present disclosure further provides a display device, comprising the frame assembly according to the embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
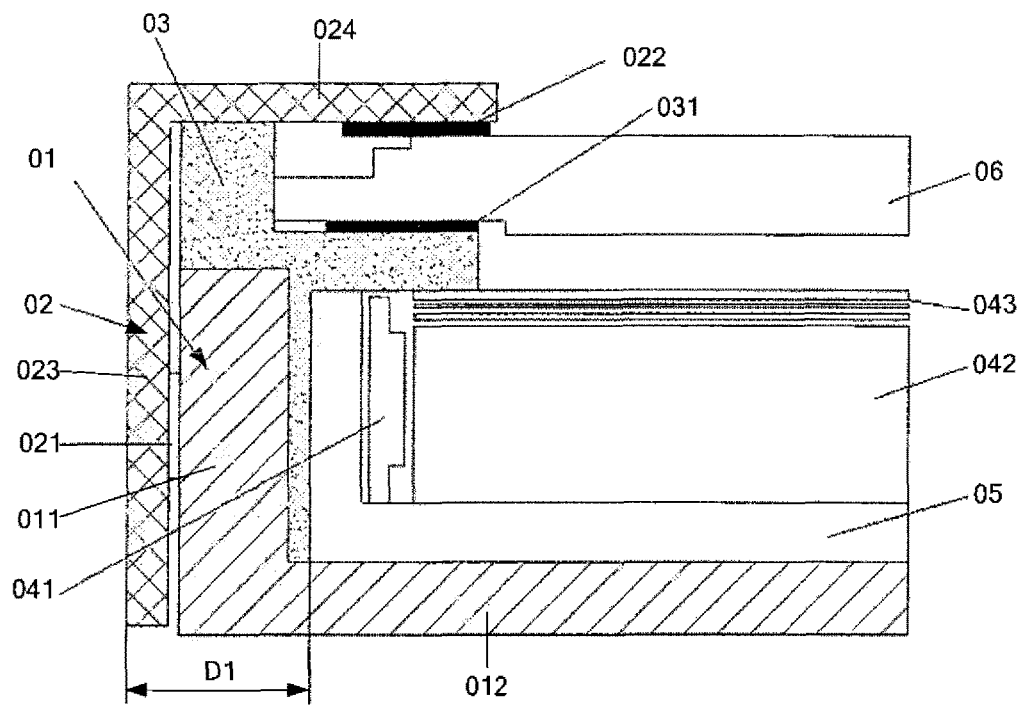
FIG. 1 is a structural schematic diagram of a frame assembly in a display device.
Figure 2:
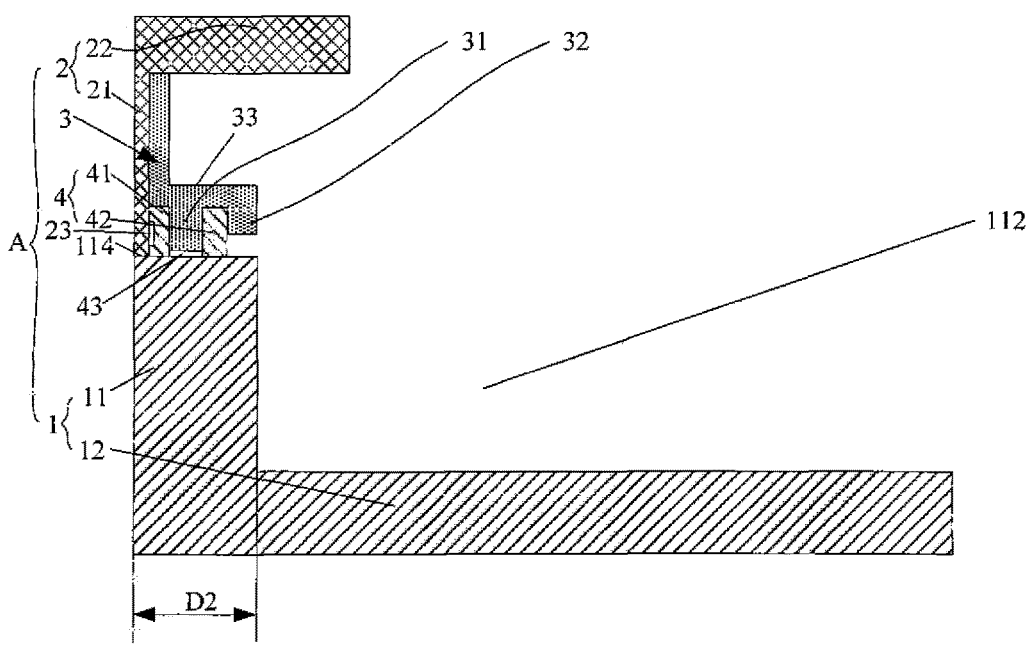
FIG. 2 is a structural schematic diagram of a frame assembly in a display device provided by an embodiment of the present disclosure.

With reference to FIG. 2. FIG. 2 is a structural schematic diagram of a frame assembly in a display device provided by an embodiment of the present disclosure.

Figure 3:
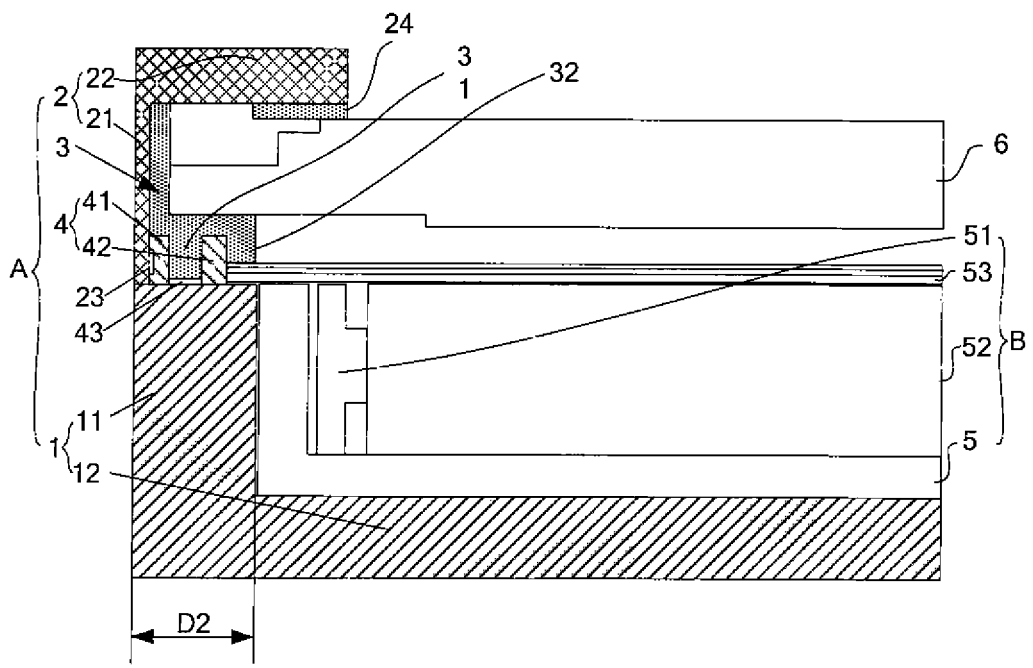
FIG. 3 is a structural schematic diagram of the display device provided by an embodiment of the present disclosure.
Figure 4:
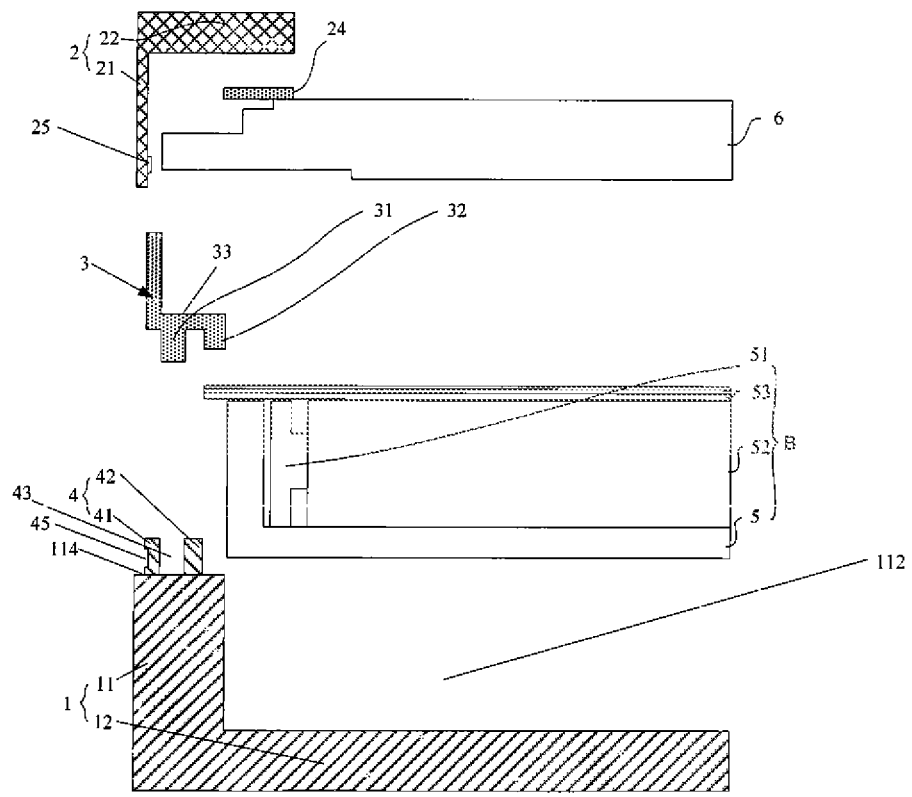
FIG. 4 is a dismantlement schematic diagram of FIG. 3.

The disclosure further provides a display device. As shown in FIG. 3 and FIG. 4, the display device comprises a frame assembly A, a backlight module B and a display panel 6; the backlight module B includes a reflective sheet 5, a light source 51, a light guide plate 52 and an optical membrane 53. A width of the frame assembly A is an important factor affecting a narrow frame design of the display device, and the frame assembly A provided by the disclosure facilitates achieving a narrow frame design of the display device.

As shown in FIG. 2, the frame assembly A of the display device provided by the present embodiment comprises: a backplane 1, including a base plate 12 and a plurality of side plates 11 to form a mounting tank 112 for mounting a backlight module 13; a front frame 2, having pressing plates 22 parallel with the base plate 12 and corresponding to the side plates 11 one by one, and fixing plates 21 parallel with the side plates 11 and corresponding to the side plates 11 one by one; and a side frame 4, located on one side of the backplane 1 facing the pressing plates 22, and located on an inner side of the fixing plates 21, the side frame 4 and respective side plates 11 of the backplane 1 being fixedly connected. For at least one group of a side plate 11, a pressing plate 22 and a fixing plate 21 that corresponding to each other, a structure as follows is comprised: the fixing plate 21 is fixed on the side frame 4, and an outer surface of the fixing plate is not higher than an outer surface of the side plate 11; the side frame 4 is provided with an elastic pad 3 located on an inner side of the fixing plate 21, an inner surface of the elastic pad 3 forms a step surface 33 for supporting and limiting the display panel 6, and the elastic pad 3 abuts against the pressing plate 22 and the fixing plate 21, and a projection of the side frame 4 and a projection the elastic pad 3 in a plane of a side surface, facing the pressing plate 22, of the side plate 11 of the backplane 1 are located within the side surface, facing the pressing plate 22, of the side plate 11.

In the frame assembly A, the side frame 4 and the side plate 11 of the backplane 1 are fixedly connected, and the fixing plate 21 of the front frame 2 is fixed on the side frame 4, to ensure stability of the connection among the front frame 2, the side frame 4, and the backplane 1. In the meantime, the side frame 4 and the side plate 11 of the backplane 1 coordinate to form a step surface 114 for supporting the fixing plate 21, and one side, facing the base plate 12 of the backplane 1, of the fixing plate 21 is supported on the step surface 114, to make sure that the fixing plate 21 is accommodated in the step surface 114 in a direction parallel to a light emergent surface of the display panel 6. A support limitation structure for the display panel 6 can be formed between the pressing plate 22 of the front frame 2 and the step surface 33 of the elastic pad 3 to ensure stability of the display panel 6 after installation. After the front frame 2, the side frame 4, the backplane 1, and the elastic pad 3 are installed, an outer surface of the fixing plate 21 of the front frame 2 is not higher than an outer surface of the side plate 11 of the backplane 1, and a projection of the side frame 4 and a projection of the elastic pad 3 in a plane of a side surface, facing the pressing plate 22, of the side plate 11 of the backplane 1 is located within the side surface, facing the pressing plate 22, of the side plate 11. Therefore, a width of the frame assembly A is a thickness of the side plate 11 of the backplane 1, as indicated by D2 in FIG. 2.

Thus, the frame assembly A facilitates achieving a narrow frame design of a display device.

For example, as shown in FIG. 2, in the frame assembly A, the side frame 4 and the side plate 11 coordinate to form the step face 114 located on an outer side of the side frame 4 to support the fixing plate 21.

For example, in an embodiment, as shown in FIG. 2, the side frame 4 is provided with a slot 43 having an opening facing the pressing plate 22. As shown in FIG. 2, a side surface, facing away from the pressing plate 22, of the elastic pad 3 contains a protrusion 31 to be plugged into the slot 43, and the elastic pad 3 is mounted on the side frame through the slot 43 and the protrusion 31.

For example, as shown in FIG. 2, the side frame 4 may include a first frame assembly 41 and a second frame assembly 42, the first frame assembly 41 is located on an outer side of the second frame assembly 42, and the slot 43 is formed between the first frame assembly 41 and the second frame assembly 42.

There are a variety of ways for setting the elastic pad 3.

Figure 5:
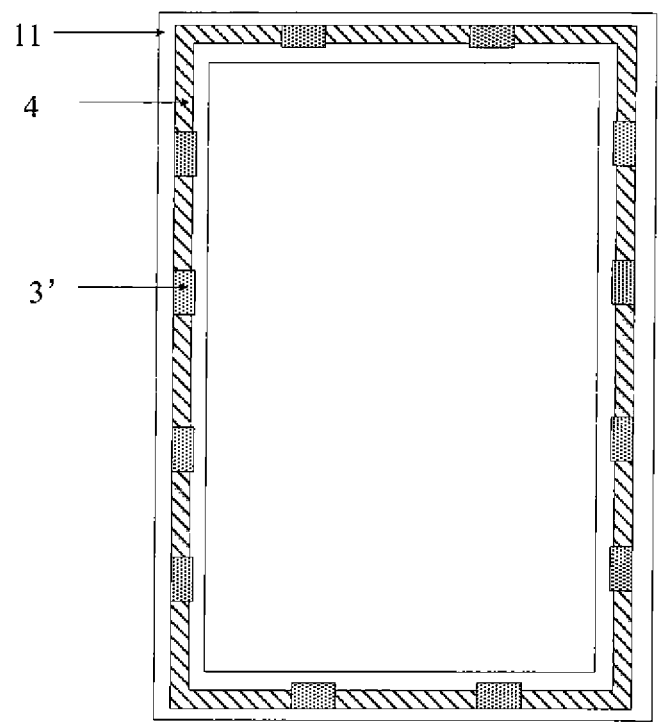
FIG. 5 is a schematic diagram of a sub-elastic pad provided by an embodiment of the present disclosure.

For example, when a narrow frame design is to be achieved on all the four sides of the display device, the elastic pad 3 may be of an integral sealed ring-like structure, and the elastic pad 3 can include a plurality of sub-elastic pads 3' as well, and the plurality of sub-elastic pads are evenly distributed on the side frame 4, as shown in FIG. 5.

For example, when a narrow frame design is to be achieved on only a portion of the sides of the display device, the elastic pad 3 is set on a side frame required to achieve the narrow frame design, and the elastic pad 3 may be of an integral structure or the elastic pad 3 can include a plurality of sub-elastic pads 3' as well to form a split-type structure, and the plurality of sub-elastic pads 3' are evenly distributed on the corresponding side frame 4.

Figure 6:
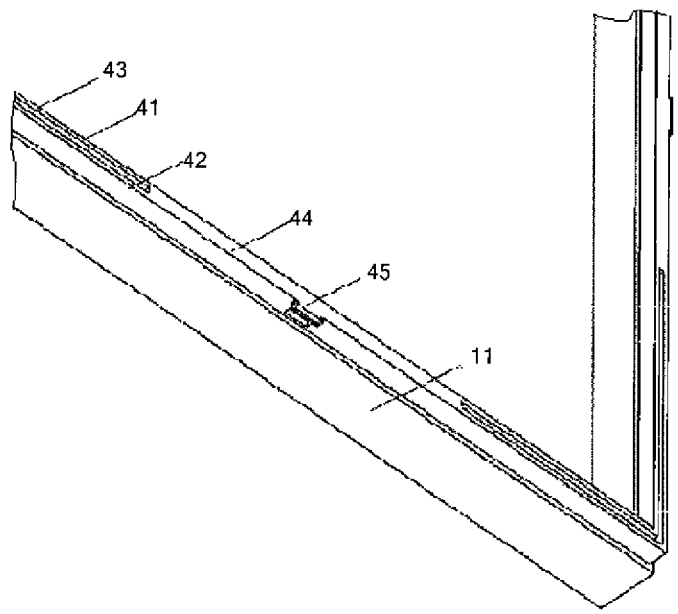
FIG. 6 is a structural schematic diagram of a side of a backplane and a side frame of the frame assembly in the display device provided by an embodiment of the present disclosure.

For example, as shown in FIG. 6, in the case where the elastic pad 3 includes a plurality of sub-elastic pads, and the plurality of sub-elastic pads are evenly distributed on the side frame 4, the slots 43 provided on the side frame 4 corresponds to the sub-elastic pads one by one. That is, the slots 43 provided on the side frame 4 are of a segmented type, and a portion 44 of the side frame 4 located between any two adjacent segments of the slots 43 is of a solid structure, and thus can enhance a mechanical strength of the side frame 4, and improve stability of the front frame 2 and the side frame 4 after assembly.

Figure 7:
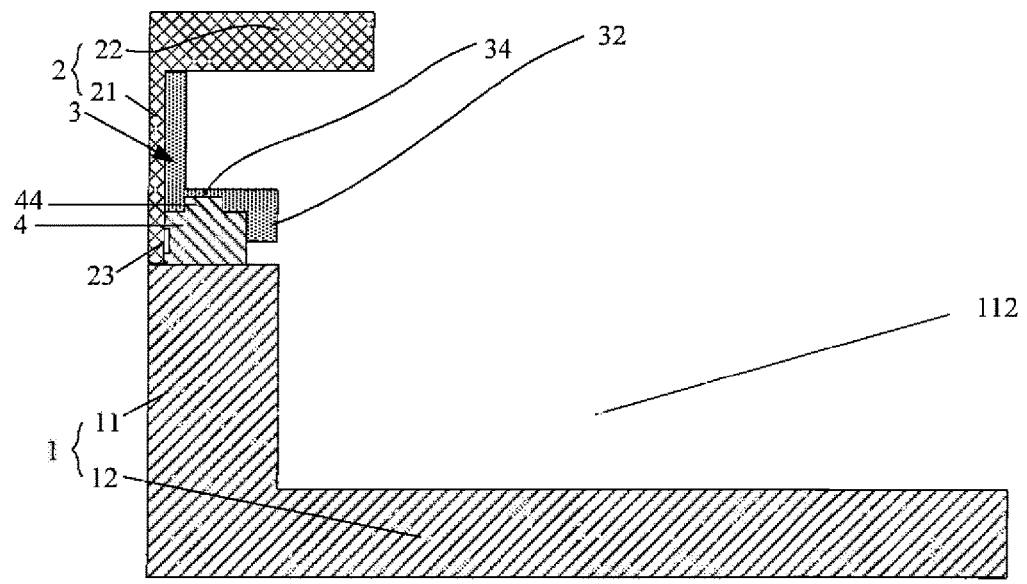
FIG. 7 is a structural schematic diagram of a frame assembly in a display device provided by another embodiment of the present disclosure.
Figure 8:
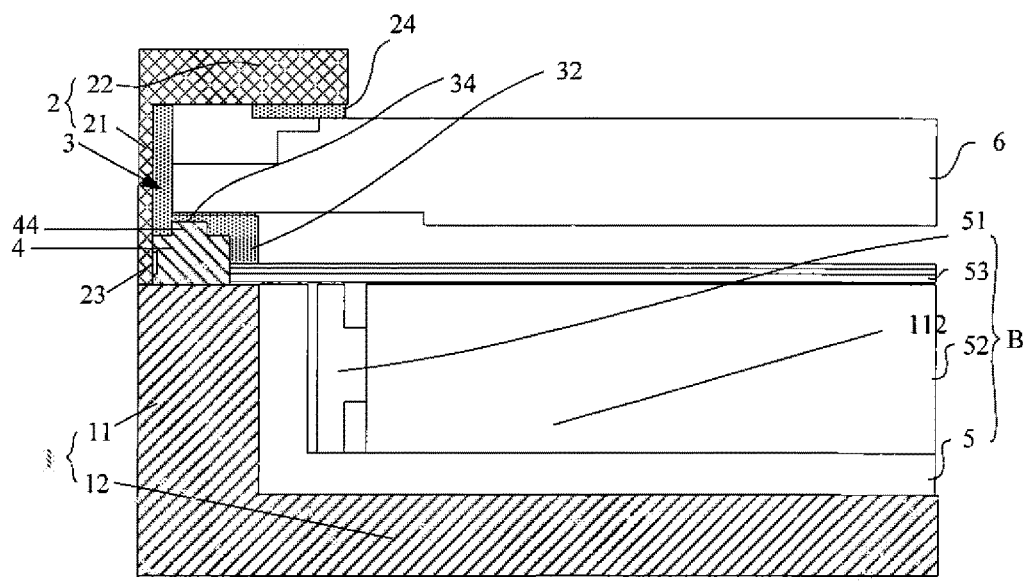
FIG. 8 is a structural schematic diagram of the display device provided by an embodiment of the present disclosure.
Figure 9:
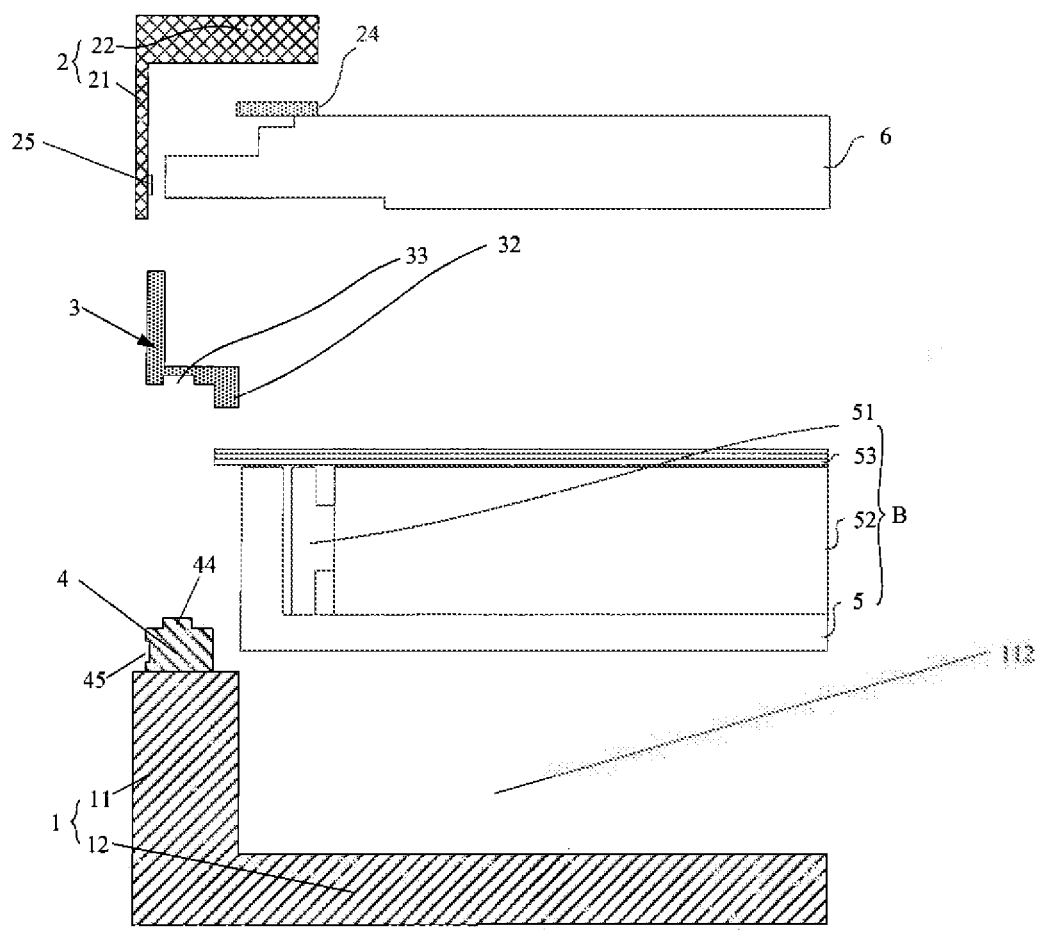
FIG. 9 is a dismantlement schematic diagram of FIG. 8.

In another embodiment, as shown in FIG. 7, a side surface, facing away from the pressing plate 22, of the elastic pad 3 contains a slot 34, a side surface, facing the pressing plate 22, of the side frame 4 has a protrusion 44 plugged into the slot 34, and the elastic pad 3 is mounted on the side frame 4 through the slot 34 and the protrusion 44. FIG. 8 is a schematic diagram of the display device comprising the frame assembly. FIG. 9 is a dismantlement schematic diagram of the display device.

With further reference to FIG. 2, for example, the fixing plate 21 mentioned in the above embodiment is fixed on the side frame 4, which, for example, can be implemented in following ways:

With further reference to FIG. 2, the fixing plate 21 is engaged with the side frame 4 through an engaging mechanism 23. As shown in FIG. 4, the engaging mechanism 23 includes a plurality of pairs of snaps 25 and slots 45 engaged with each other. For example, as shown in FIG. 5, the side frame 4 is provided with the slots 45; alternatively the slot(s) can be set on the fixing plate 21 while the side frame 4 can be provided with snaps.

With further reference to FIG. 3, in the front frame 2, a pad 24 convex to the backplane 1 is set on a side surface, facing the base plate 12 of the backplane 1, of the pressing plate 22. The pad 24 can be provided to perform the function of anti-sliding and dustproof, increase stability of the pressing plate 22 in limiting the display panel 6, and meanwhile can reduce dust entering the display device, so as to prolong the service life of the display device.

With further reference to FIG. 3, a side surface, facing away from the pressing plate 22, of the elastic pad 3 is further provided with a pressing protrusion 32 for pressing an optical membrane 53 of the backlight module B. The pressing protrusion 32 can improve stability of optical membrane 53 after installation.

For example, in an embodiment, the side frame 4 and the backplane 1 have an integral structure.

The embodiments of the present disclosure provide a frame assembly and a display device comprising the frame assembly. The frame assembly comprises: a backplane, including a base plate and a plurality of side plates to form a mounting tank for mounting a backlight module; a front frame, having pressing plates parallel with the base plate and corresponding to the side plates one by one, and fixing plates parallel with the side plates and corresponding to the side plates one by one; and a side frame, located on one side, facing the pressing plates, of the backplane and located on an inner side of the fixing plates, the side frame and respective side plates of the backplane being fixedly connected; in at least one group of corresponding side plate, pressing plate and fixing plate: the fixing plate is fixed on the side frame, and an outer surface of the fixing plate is not higher than an outer surface of the side plate; the side frame is provided with an elastic pad located on an inner side of the fixing plate, an inner surface of the elastic pad provides a step surface for supporting and limiting a display panel, and a projection of the side frame and a projection of the elastic pad in a plane of a side surface, facing the pressing plate, of the side plate of the backplane are located within the side surface, facing the pressing plate, of the side plate. The frame assembly facilitates achieving a narrow frame design of the display device.

The foregoing embodiments merely are exemplary embodiments of the disclosure, and are not intended to define the scope of the disclosure. Changes and replacements, which any skilled in the art can easily think of, within a technical scope of the present disclosure, shall fall within the protection scope of the present disclosure. Thus, the protection scope of the disclosure is determined by the claims.

The present application claims priority of Chinese Patent Application No. 201520003242.6 filed on Jan. 4, 2015, the disclosure of which is incorporated herein by reference in its entirety as part of the present application.

The invention claimed is:

1. A frame assembly, comprising:
   a backplane, including a base plate and a plurality of side plates to form a mounting tank for mounting a backlight module;
   a front frame, having pressing plates parallel with the base plate and corresponding to the side plates one by one, and fixing plates parallel with the side plates and corresponding to the side plates one by one; and
   a side frame, located on one side of the backplane facing the pressing plates, and located on an inner side of the fixing plates, the side frame and respective side plates of the backplane being fixedly connected;
   wherein, for at least one group of corresponding side plate, pressing plate and fixing plate, a structure as follows is provided: the fixing plate is fixed on the side frame, and an outer surface of the fixing plate does not extend beyond an outer surface of the side plate;
   the side frame is provided with an elastic pad located on an inner side of the fixing plate, an inner surface of the elastic pad provides a first step surface for supporting and limiting a display panel, and an inner surface of the side frame and the first step surface of the elastic pad do not extend beyond an inner surface of the side plate.

2. The frame assembly according to claim 1, wherein the side frame and the side plate coordinate to form a second step surface located on an outer side of the side frame and configured to support the fixing plate.

3. The frame assembly according to claim 1, wherein the side frame is provided with slots having an opening facing the pressing plate, a side surface, facing away from the pressing plates, of the elastic pad contains protrusions to be plugged into the slots, and the elastic pad is mounted on the side frame through the slots and the protrusions.

4. The frame assembly according to claim 3, wherein the elastic pad has an integral structure.

5. The frame assembly according to claim 3, wherein the elastic pad includes a plurality of sub-elastic pads, and the plurality of sub-elastic pads are evenly distributed on the side frame.

6. The frame assembly according to claim 5, wherein the slots provided on the side frame correspond to the sub-elastic pads one by one.

7. The frame assembly according to claim 1, wherein, a side surface, facing away from the pressing plates, of the elastic pad contains a slot, a side surface of the side frame facing the pressing plate has a protrusion to be plugged into the slot, and the elastic pad is mounted on the side frame through the slot and the protrusion.

8. The frame assembly according to claim 1, wherein the fixing plates are fixed on the side frame, comprising:
   the fixing plates and the side frame are connected through a plurality of pairs of snaps and slots engaged with each other.

9. The frame assembly according to claim 1, wherein a pad is set on a side surface, facing the base plate, of each of the pressing plates.

10. The frame assembly according to claim 1, wherein a side surface, facing away from the pressing plates, of the elastic pad further has a pressing protrusion for pressing an optical membrane of the backlight module.

11. The frame assembly according to claim 1, wherein the side frame and the backplane have an integral structure.

12. A display device, comprising a display panel and the frame assembly according to claim 1.

13. The frame assembly according to claim 2, wherein a side surface, facing away from the pressing plates, of the elastic pad further has a pressing protrusion for pressing an optical membrane of the backlight module.

14. The frame assembly according to claim 2, wherein the side frame and the backplane have an integral structure.

15. The frame assembly according to claim 3, wherein a side surface, facing away from the pressing plates, of the elastic pad further has a pressing protrusion for pressing an optical membrane of the backlight module.

16. The frame assembly according to claim 3, wherein the side frame and the backplane have an integral structure.

17. The frame assembly according to claim 7, wherein a side surface, facing away from the pressing plates, of the elastic pad further has a pressing protrusion for pressing an optical membrane of the backlight module.

18. The frame assembly according to claim 7, wherein the side frame and the backplane have an integral structure.

19. The frame assembly according to claim 8, wherein a side surface, facing away from the pressing plates, of the elastic pad further has a pressing protrusion for pressing an optical membrane of the backlight module.

20. The frame assembly according to claim 8, wherein the side frame and the backplane have an integral structure.

\* \* \* \* \*